Figure 1:
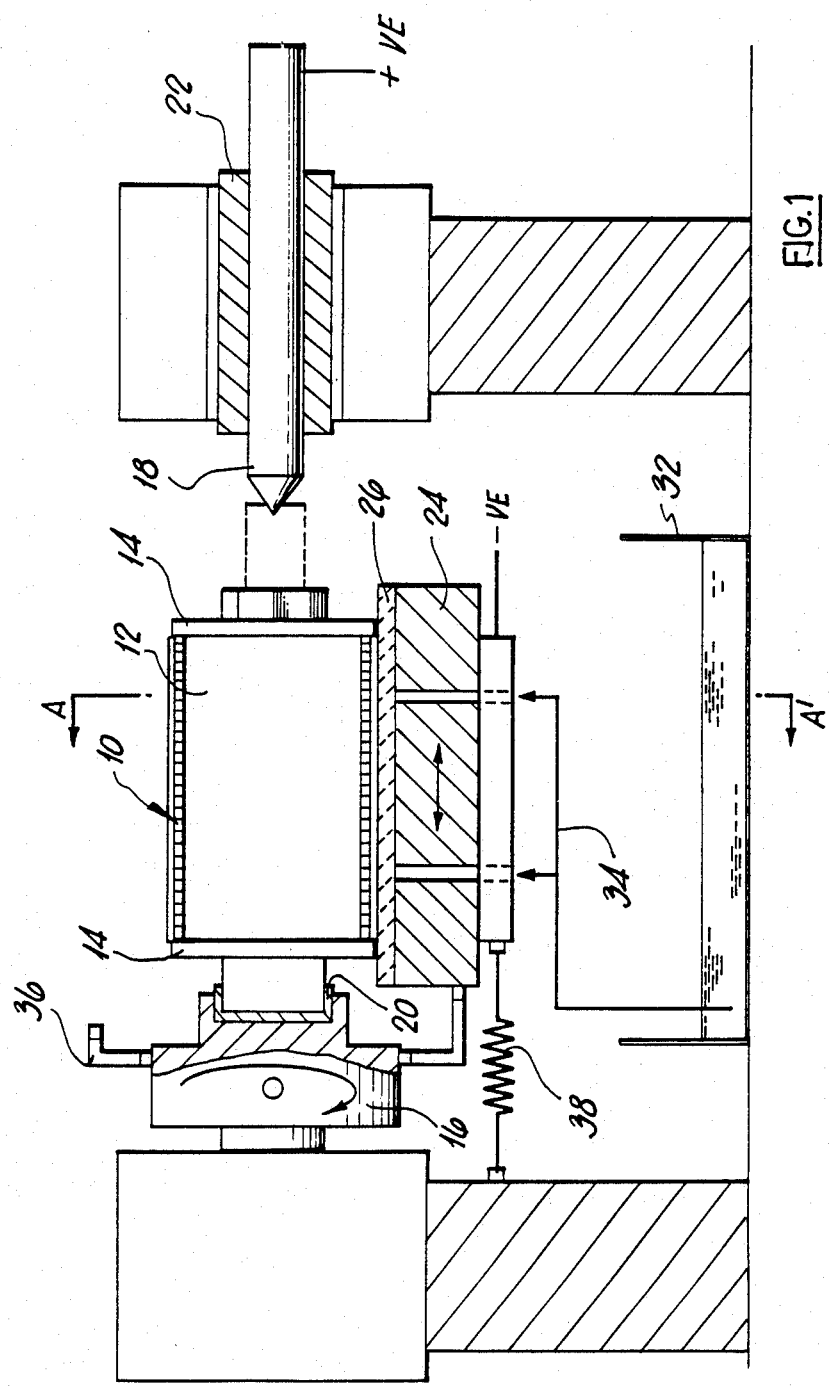

United States Patent [19]

Adams et al.

[11] Patent Number: 4,830,719
[45] Date of Patent: May 16, 1989

[54] METHOD FOR ETCHING PISTON RINGS

[75] Inventors: David R. Adams, Rugby; Johnathan D. Philby, Near Ilkley; Alan D. Pope; David F. Spence, both of Rugby; David R. Eastham, Herts, all of United Kingdom

[73] Assignee: AE PLC, Rugby, England

[21] Appl. No.: 209,906

[22] Filed: Jun. 22, 1988

[30] Foreign Application Priority Data

Jun. 30, 1987 [GB] United Kingdom ............... 8715267

[51] Int. Cl.⁴ .............................................. C25F 3/02
[52] U.S. Cl. ........................... 204/129.46; 204/129.7; 204/129.75; 204/129.95; 204/217; 204/222
[58] Field of Search ............. 204/129.46, 217, 129.75, 204/129.95, 32.1, 39

[56] References Cited

U.S. PATENT DOCUMENTS

| 2,315,798 | 4/1943 | Koether | 204/129.75 X |
| 4,176,434 | 12/1979 | Cromwell et al. | 29/156.63 |
| 4,214,952 | 7/1980 | Sato et al. | 204/14 R |
| 4,294,673 | 10/1981 | Kimoto et al. | 204/129.46 |

FOREIGN PATENT DOCUMENTS 1348033 1/1963 France ........................... 204/129.75

Primary Examiner—Donald R. Valentine
Attorney, Agent, or Firm—William R. Hinds

[57] ABSTRACT

A method for the etching of chromium-coated piston rings comprises the steps of producing relative movement and rubbing contact between the chromium-coated surface of a piston ring which is anodic and a cathode having a porous material on the rubbing surface thereof, supplying an electrolyte to the porous material between the anodic ring surface and the cathode, establishing an electrical potential therebetween and supplying an electrical current for a period of time during the relative movement.

12 Claims, 2 Drawing Sheets

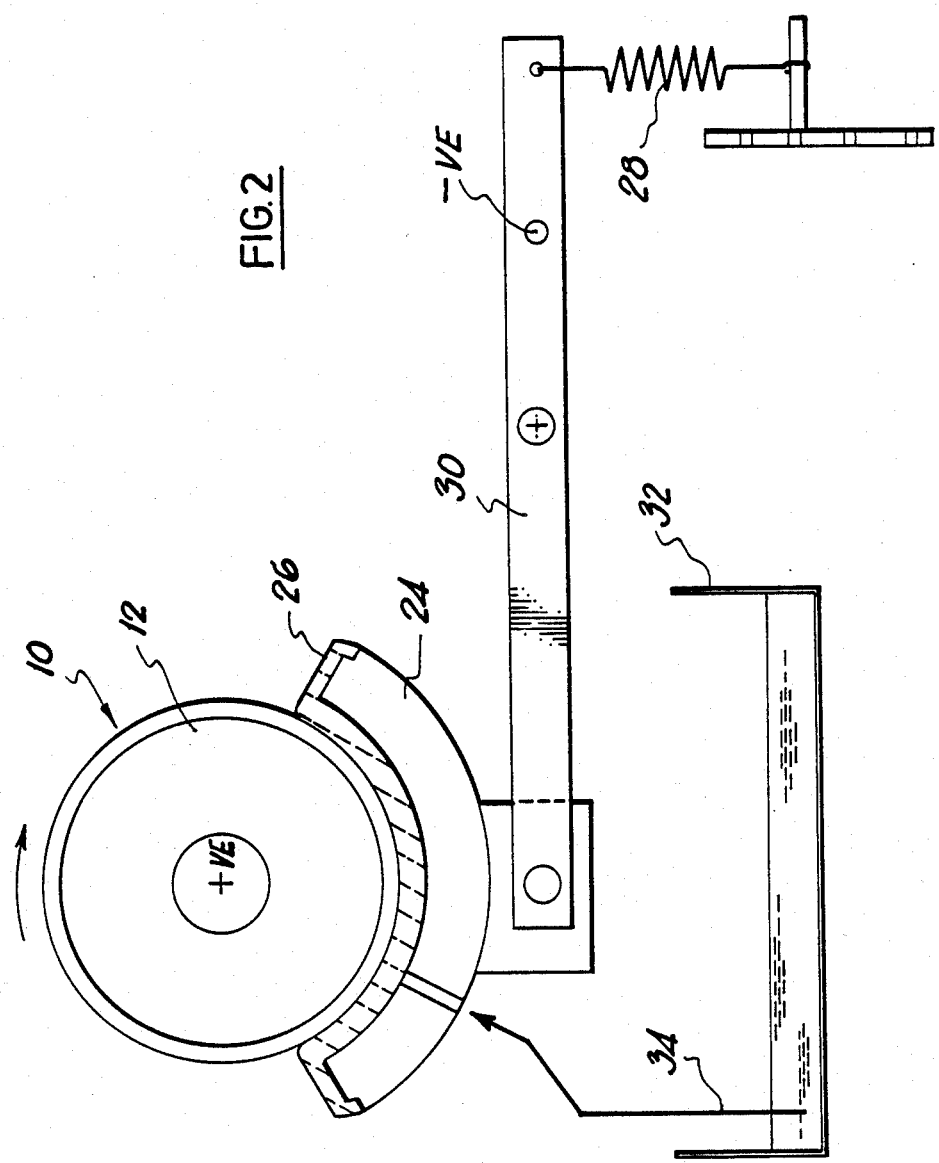

METHOD FOR ETCHING PISTON RINGS

The present invention relates to piston rings and more particularly to a process and apparatus for the treatment of the working surface thereof.

It is well known to chromium plate at least the surface of a piston ring which co-operates with the cylinder or cylinder liner in order to improve wear and scuffing-resistance of the piston ring. "Scuffing" of a piston ring with the mating cylinder surface is effectively localised welding of the two rubbing surfaces. Small particles of one surface are transferred to the other surface. Scuffing, once initiated, leads to a very rapid increase in wear rate.

Scuffing-resistance of chromium plated piston rings may still be further improved by increasing the surface porosity of the chromium plate. This has been achieved in the past by several different etching methods all relying upon the total immersion of the piston ring in a bath of electrolyte. In these methods the chromium at the crack boundaries which are generated during plating is selectively removed leaving a porous surface of plateaux surrounded by channels or widened cracks formed by etching away of the material.

One method which has been used involves the immersion of the piston rings in a bath of sodium hydroxide and electrolytically etching at about 6 to 7 volts for about 1 minute at a current density in the range 1 to 3 Amp/in$^2$. After etching a lapping process is generally necessary to produce the required piston ring surface dimension and finish.

Other methods employing an essentially similar technique but with different parameters are also used.

All of the known techniques, however, suffer from one or more of the following disadvantages in that they have limited economic production capacity, have poor consistency of results or require a subsequent lapping operation to produce the required finish.

A method has now been discovered which is easily amenable to economic scaling for any desired production capacity, produces consistent results and does not require a subsequent lapping operation.

According to the present invention a method for the etching of chromium-coated piston rings comprises the steps of producing relative movement and rubbing contact between the chromium-coated surface of a piston ring which is anodic and a cathode having a porous material on the rubbing surface thereof, supplying an electrolyte to the porous material between the anodic ring surface and the cathode, establishing an electrical potential therebetween and supplying an electrical current for a period of time during the relative movement.

In one embodiment of the method of the present invention the electrolyte may be pumped through the porous material with a supply either externally or via the cathode.

The porous material may comprise a material such as that sold under the tradename "Scotchbrite". This material is mildly abrasive and serves to provide a polishing action simultaneously with the etching of the surface. This is particularly advantageous as the need for a subsequent lapping operation may be avoided.

A pack of piston rings may be axially stacked and etched simultaneously whilst being held in a jig.

Preferably the piston rings may be rotated and the cathode and porous material held against them.

Simultaneous lateral or axial movement of the cathode has been found to be beneficial.

Etching time may be varied depending upon the severity of etch desired as may the voltage and current employed. The current, is controlled as a function of area and quoted as current density.

In order that the present invention may be more fully understood an example will now be described by way of example only with reference to the accompanying drawings, of which:

FIG. 1 shows a section through a schematic apparatus for carrying out the method of the invention; and FIG. 2 which shows a section through the apparatus of FIG. 1 on the line AA' looking in the direction of the arrows.

Referring now to the drawings and where the same features are denoted by common reference numerals. A pack of piston rings 10 having chromium plating on their outer rubbing faces is mounted on a mandrel 12 and secured between end plates 14. The mandrel is rotatably mounted between a driving chuck 16 and a tailstock 18, the mandrel being electrically isolated from the chuck 16 and tailstock 18 by insulation members 20 and 22. A graphite electrode 24 having a pad of porous material 26, which in this case is one of the materials sold under the trademark "Scotchbrite", is held in contact with the chromium plated rings by suitable loading means, shown in FIG. 2 as a spring-biased arm 28,30. A supply of electrolyte is supplied from a tank 32 by a pump (not shown) via a conduit 34 to the electrode pad 26. The electrode 24 is also oscillated in the lateral or axial direction by means of a cam 36 which rotates with the chuck 16, the electrode is biased against the cam 36 by a spring 38. The ring pack is made anodic via the tailstock 18 and the graphite electrode 24 is made cathodic. The anode and cathode are connected to a known power supply and controller (not shown).

Typical crack parameters are width 5 to 15 micrometers, a depth of 6 to 20 microns with a surface Rz of 0.8 to 2 (measured on the 1S0 10 point height parameter).

The above apparatus was used to etch piston rings of diameter 81 mm. The current was limited to 10 amps which in conjunction with an electrode area of 3870 mm$^2$ gave a current density of $2.6 \times 10^{-3}$ A/mm$^2$. Potential was set to 6 volts. The rotational speed of the rings was 20 rev/min. The electrolyte used was 10% by weight sodium hydroxide solution. Etching times varied between 30 seconds and 20 minutes. The above specification could be met with ampere hour ratings varying between $2 \times 10^{-4}$ and $1.5 \times 10^{-3}$ Amp hours/mm$^2$.

The etching parameters may be varied within the range from $1 \times 10^{-4}$ to $1 \times 10^{-2}$ Amp hours/mm$^2$ depending upon the severity of etch required.

Rotational speed has been found to give uniform results when varied within the range from 5 to 100 rev/min although this may depend upon ring diameter and wider limits may, in some cases, be appropriate. A preferred range may be 20 to 50 rev/min.

Axial or lateral oscillation of the etching electrode may be employed as this has been found to lessen end effects on the ring pack. Such oscillation should exceed the individual ring width and the etching electrode should be of sufficient length so that the ring pack is at all times covered.

Although the invention has been described using a sodium hydroxide solution as the etchant other solutions may be used such as, for example, chromium plating solutions employing chromic and sulphuric acids.

We claim:

1. A method for the etching of chromium-plated piston rings comprises the steps of producing relative movement and rubbing contact between the chromium-coated surface of a piston ring which is anodic and a cathode having a porous material on the rubbing surface thereof, supplying an electrolyte to the porous material between the anodic ring surface and the cathode, establishing an electrical potential therebetween and supplying electrical current for a period of time during the relative movement.

2. A method according to claim 1 wherein the electrolyte is pumped through the porous material.

3. A method according to claim 1 wherein the electrolyte is sodium hydroxide solution.

4. A method according to claim 1 wherein the electrolyte is a chromium plating solution.

5. A method according to claim 1 wherein the piston rings are rotated.

6. A method according to claim 5 wherein the rings are rotated at between 10 and 100 rev/min.

7. A method according to claim 5 wherein the rings are rotated at between 20 and 50 rev/min.

8. A method according to claim 1 wherein the cathode is oscillated in the axial direction.

9. A method according to claim 8 wherein the cathode is oscillated by more than a ring thickness.

10. A method according to claim 1 wherein the cathode is longer than the ring pack.

11. A method according to claim 1 wherein the piston rings are etched for between $1 \times 10^{-4}$ and $1 \times 10^{-2}$ Amp hours/mm$^2$.

12. A method according to claim 11 wherein the piston rings are etched for between $2 \times 10^{-4}$ and $1.5 \times 10^{-3}$ Amp hours/mm$^{-2}$.

* * * * *